US010065114B2

United States Patent
Goetgeluk et al.

(10) Patent No.: US 10,065,114 B2
(45) Date of Patent: Sep. 4, 2018

(54) HAPTIC GLOVE FOR USE IN A VIRTUAL ENVIRONMENT

(71) Applicant: Virtuix Holdings Inc., Austin, TX (US)

(72) Inventors: Jan Goetgeluk, Houston, TX (US); Thor Walker, Fair Oaks Ranch, TX (US); Kevin Jacob Koch, Lincoln, NE (US); Marissa Garcia, Dallas, TX (US); Kevin Gravesmill, Houston, TX (US); Julia Kwok, Katy, TX (US); Yi Ji, Houston, TX (US)

(73) Assignee: VIRTUIX HOLDING INC., Austin, TX (US)

( * ) Notice: Subject to any disclaimer, the term of this patent is extended or adjusted under 35 U.S.C. 154(b) by 103 days.

(21) Appl. No.: 15/056,741

(22) Filed: Feb. 29, 2016

(65) Prior Publication Data

US 2016/0296838 A1 Oct. 13, 2016

Related U.S. Application Data

(60) Provisional application No. 62/144,253, filed on Apr. 7, 2015.

(51) Int. Cl.
*A63F 13/285* (2014.01)
*A63F 13/00* (2014.01)
*G06F 3/01* (2006.01)

(52) U.S. Cl.
CPC ........... *A63F 13/285* (2014.09); *A63F 13/00* (2013.01); *G06F 3/014* (2013.01); *G06F 3/016* (2013.01)

(58) Field of Classification Search
None
See application file for complete search history.

(56) References Cited

U.S. PATENT DOCUMENTS

| | | | |
|---|---|---|---|
| 6,592,339 B1 * | 7/2003 | Fukushima | F04B 9/047 417/269 |
| 8,004,492 B2 * | 8/2011 | Kramer | G06F 3/03543 345/156 |
| 8,922,355 B2 * | 12/2014 | Kusuura | G06F 3/00 340/407.1 |
| 9,229,530 B1 * | 1/2016 | Wu | G06F 3/016 |
| 2010/0134327 A1 * | 6/2010 | Dinh | G06F 3/014 341/20 |

* cited by examiner

*Primary Examiner* — Muhammad N. Edun
*Assistant Examiner* — Jerold Murphy
(74) *Attorney, Agent, or Firm* — Polsinelli PC

(57) ABSTRACT

Disclosed is a haptic feedback device for converting virtual environment data into haptic feedback. Haptic feedback device can have a housing configured to receive a motor. The motor can be coupled to a camshaft and a main bladder disposed beneath the camshaft within the housing. The main bladder can be coupled to a valve controller via tubing and the valve controller can have a manifold and one or more valves. The one or more valves can be coupled to one or more haptic sensors via secondary tubing.

15 Claims, 4 Drawing Sheets

HAPTIC GLOVE FOR USE IN A VIRTUAL ENVIRONMENT

CROSS-REFERENCE TO RELATED APPLICATIONS

This application claims benefit to U.S. Provisional Application Ser. No. 62/144,253, filed Apr. 7, 2015, which is hereby incorporated herein by reference in its entirety.

FIELD

The subject matter herein generally relates to feedback sensory. More specifically, the subject matter herein feedback sensory in a wearable glove for use in a virtual environment.

BACKGROUND

Within a virtual environment, users typically desire the ability to receive haptic feedback when interacting with elements or objects in the virtual environment. In particular, the user's desires the ability to physically interact with their hands, for example, by touching objects or elements. Accordingly, haptic gloves are designed to provide haptic feedback to a user's fingers and hands when a user touches objects in the virtual environment.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Figure 1:
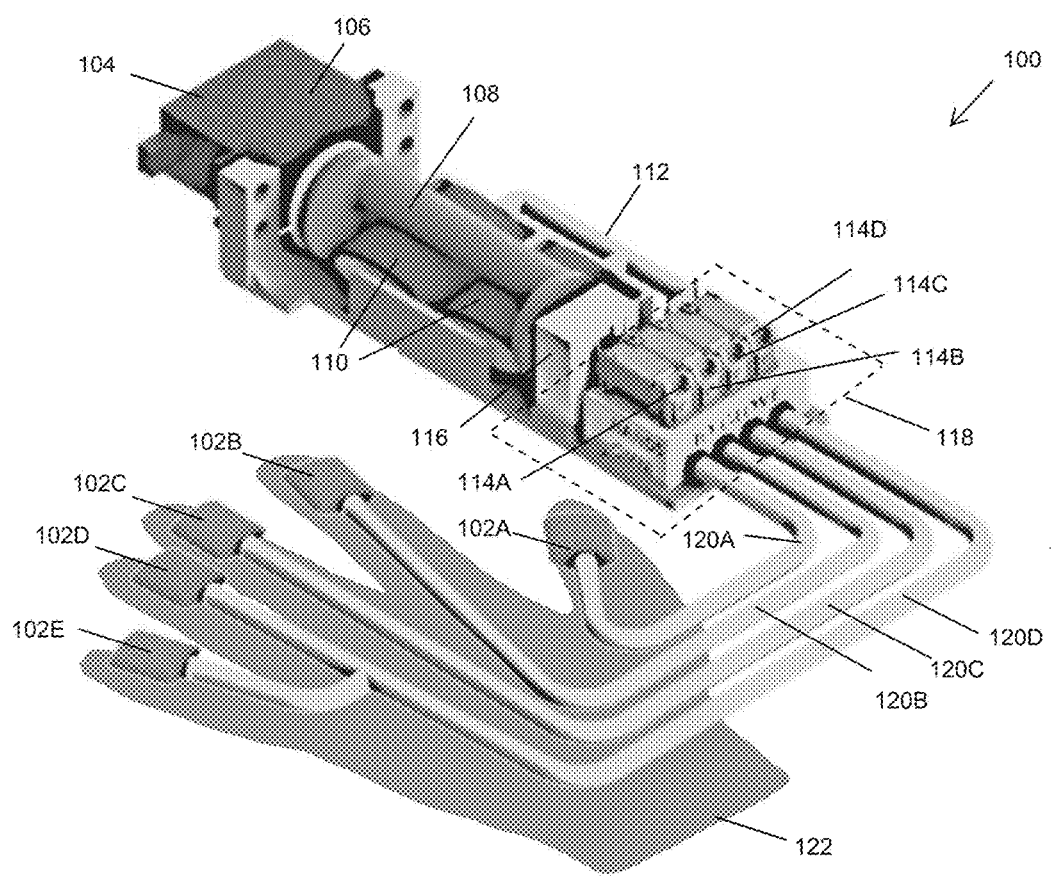
FIG. 1 is an isometric view of an example embodiment of a haptic feedback device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected.

The term "haptic" is defined as "of or relating to the sense of touch, in particular relating to the perception and manipulation of objects using the senses of touch and proprioception."

The term "outside" refers to a region that is beyond the outermost confines of a physical object. The term "inside" indicates that at least a portion of a region is partially contained within a boundary formed by the object.

Virtual environments depend on sensory feedback, whether its auditory, visual, haptic, or olfactory, to provide a realistic experience to a user. The present disclosure is described in relation to a haptic feedback device. More specifically, a haptic feedback device integrally formed within glove. The haptic feedback device can be configured to enable a user to receive sensory feedback from a virtual reality simulation.

In some embodiments, the haptic feedback device is electronically coupled, by a wired or wireless connection, to a computer system and configured to send and receive signals from the computer system. The computer system can simulate a virtual reality environment with a user disposed within the environment. The computer system can also track the user's movements in relation to the environment and provide sensory feedback to the user. The computer system can be a personal computer (PC), server, gaming system, or mobile device, for example, an XBOX, PlayStation, Nintendo, a mobile phone, a tablet, a laptop, a smartphone, a PDA, etc.

In some embodiments, the computer system can track the user's hand and fingers in a virtual environment (e.g., using optical cameras, digital cameras, gyroscopes, lasers, etc.) and actuate the haptic feedback device. The computer system can also use inertial measurement unit (IMU) technology to track a user's hand and fingers (e.g., Control VR, Perception, PrioVR and Nod, etc.). The computer system can further use electro-magnetic tracking (e.g., Sixense STEM technology, Polhemus, etc.). In some embodiments, the computer system can use one or a combination of Leap Motion, Intel Realsense, Nimble VR, Control VR, Perception Neuron, PrioVR, Nod, Sixense STEM technology, Polhemus, or MYO to track a user's movement. Using the position data generated from tracking the user's movements, the computer system can generate haptic feedback when a user encounters an element in the virtual reality environment. For example, if the user's avatar is touching a virtual reality element (e.g., table, a door, wall, object, gun, sword, steering wheel, etc.) the user can receive haptic feedback on the hand/finger(s) touching the element. In some embodiments, an optical camera positioned to track a user's hand can determine the user's movement and the computer system can translate the user's movements to simulated movement of the user's avatar within the virtual environment.

In some embodiments, the haptic feedback device can include a housing for enclosing a motor configured to receive signals from a microcontroller. The motor can be configured to operably couple to a camshaft capable of rotating within the housing and configured to compress one or more main bladders. The one or more main bladder can be disposed below the camshaft within the housing such that as the motor operably rotates the camshaft and the camshaft compresses the one or more main bladders. In some embodiments, the haptic feedback device includes a linear actuator configured to compress the one or more main bladder. In some embodiments, the haptic feedback device can include a cylinder having piston coupled to linear actuator. The linear actuator can be configured to actuate the piston displacing air or fluid within the cylinder. Alternatively, the cylinder and piston and be coupled to a rotary actuator configured to actuate the piston and displace air or fluid within the cylinder.

The one or more main bladders can be coupled to tubing and one or more valve configured to control the flow, of air or fluid, caused by compression of the one or more main bladders. In some embodiments, the valve can be a solenoid valve. The valve can also be electrically coupled to the microcontroller. The microcontroller can send a signal to the valve to actuate controlling flow of air between the one or more main bladder and the one or more haptic sensors (e.g., secondary bladders). In some embodiments, a plurality of valves is arranged in parallel, each valve corresponding to one haptic sensor (e.g., secondary bladder).

In some embodiments, the haptic feedback device can be a forearm sleeve having a glove at one end. The forearm sleeve can have a housing formed thereon and a plurality of haptic sensors coupled to the housing by tubing formed within the material of the sleeve. The one or more haptic sensors associated with a user's fingers. The housing can be configured to receive a motor, a camshaft, one or more main bladders, a microcontroller, a power supply, and one or more solenoids values. The one or more solenoids values can enable individual actuation of each haptic sensors. The one or more solenoid values can receive a signal from the microcontroller to actuate, enabling a flow of air to the secondary air bladder. In an alternative embodiment, the ring and pinky finger haptic sensors can be linked to reduce power consumption and save weight. The ring and pinky finger often operate collectively.

In some embodiments, the microcontroller can receive a signal from the computer system and, in response send a signal to rotate the camshaft. The camshaft can rotate a predetermined angular distance depending on the volume of air needing to be displaced by compression of the main bladder to inflate the one or more haptic sensors. In some embodiments, the camshaft rotates a first predetermined distance to operate one haptic sensors. In some embodiments, the camshaft rotates a second predetermined distance greater than the first predetermined distance to operate two haptic sensors. In some embodiments, the microcontroller can access a database indicating the degrees of angular rotation required by the camshaft for various numbers of haptic sensors requiring inflating.

As the camshaft compresses the main bladder, air flows through the tubing and to the valve. The plurality of valves can receive a signal from the microcontroller (e.g., nearly simultaneous with the signal to rotate the camshaft) to actuate one or more valves enabling air flow to reach one or more haptic sensors. In some embodiments, the microcontroller can send a signal to operate three or more haptic sensors. The camshaft can rotate a predetermined distance compressing the main bladder (i.e., corresponding to the necessary air pressure to actuate three haptic sensors). The one or more valves corresponding to the appropriate haptic sensors can receive a signal to actuate thus enabling air flow from the compressed main bladder to pass to the corresponding haptic sensors. The corresponding haptic sensors can inflate as the air flow from the main bladder expands the haptic sensors thereby providing haptic feedback to the user. In some embodiments, the microcontroller can send a signal to operate one, two, three, four, or five haptic sensors depending on the arrangement and the signal received from the computer system.

After inflating the haptic sensors, the valve can close trapping the air in the haptic sensors. The computer system can then determine the user's hand or finger position no longer requires haptic feedback (i.e. the user has stopped touching an element in the virtual environment) and microcontroller can send a signal to the valve to release the air. The inflation and deflation process of each haptic sensors can be achieved repetitively. This can enable the one or more haptic sensors to inflate, retain, and release air quickly. For example, a user can be place his hand on a table in the virtual environment and begin tapping various fingers. The valves controlling the fingers resting on the table can be closed, and when the computer system detects a finger is removed from the table the valve can be opened releasing the air and removing the haptic feedback. As the finger is again placed on the table, the camshaft can rotate, compressing the bladder, and inflating the corresponding haptic sensor.

In some embodiments, the haptic feedback device can include more than one motor, each coupled to a respective camshaft. Each camshaft can be configured to compress one or more main bladders. For example, the haptic feedback device can have two motors and two camshafts working in parallel. In some embodiments, the haptic feedback device can include a motor coupled to a camshaft for each haptic sensors. For example, the haptic feedback device can receive a signal from the microcontroller and can actuate the individual motor and camshaft associated with the corresponding haptic sensors. In this arrangement the valve and valve controller can be omitted.

In some embodiments, the timing between the actuation of the main bladder and the opening of the valve can be configurable. The timing can be configured to adjust the haptic feedback delivered to the user. A simultaneous or nearly simultaneous actuation of the main bladder and the valve can result in a soft and increasing inflation of the haptic sensors. A delay between actuation of the main bladder and the valve can result in a rapid inflation of the haptic sensors. In some embodiments, the microcontroller can adjust the configuration of the actuation of the main bladder and valve based on feedback from the computer system. For example, if a user punches a wall the rapid inflation of the haptic sensors can be used. In another example, if a user gently touches a window a gradual inflation of the haptic sensors can be used.

In some embodiments, the haptic feedback device includes a power supply within the housing. The power supply can be one or more batteries. The batteries can be rechargeable (e.g., lithium ion batteries).

In some embodiments, the haptic feedback device can function in either a wireless or a wired configuration. In some embodiments, the haptic feedback device can be coupled to the computer system wirelessly. The wireless coupling can be short-range wireless, BLUETOOTH® or Wi-Fi. Alternatively, the haptic feedback device can be wired to the computer system. A wired connection can provide power either reducing the need to include a battery within the housing or providing charge for a rechargeable battery.

In some embodiments, the haptic feedback device can utilize compressed gas to generate air flow. The haptic feedback device can have a compressed gas canister within the housing or a supply line to an external canister. In this arrangement, the housing can have a regulator configured to adjust the pressure between the compressed gas source and the one or more valves, thus prevent over pressurization within the system. In some embodiments, the compressed gas canister can be configured to have a quick disconnect enabling quick change between canisters. In some embodiments, the compressed gas canister can be stored in a larger housing worn on a user's back and linked to the haptic feedback device with additional tubing.

In another embodiment, the haptic feed back device can utilize vibration motors. For example, each finger can include a vibration motor as a haptic sensor. The vibration motors can be connected to a microcontroller configured to receive data from the computing system. In response to receiving data, the microcontroller can actuate one or more of the vibration motors in order to provide haptic feedback to the user.

FIG. 1 illustrates an isometric view of an example haptic feedback device 100 installed in a glove 122. The haptic feedback device 100 can include a housing (not shown) configured receive a motor 106 (e.g., servomotor), a camshaft 108, one or more main bladder 110, and valve controller 118. The housing can be secured to a user's forearm or wrist. The haptic feedback device 100 can also include a glove 122 and haptic sensors 102A, 102B, 102C, 102D, 102E (collectively "102). In some embodiments motor 106 and camshaft 108 can be a linear actuator. The housing can further include a microcontroller 104. The microcontroller 104 can be configured to receive signals from the computer system and send signals to the motor 106 and valve controller 118. The motor 106 can be configured to receive signals from the microcontroller 104 and operate the camshaft 108 coupled thereto. The motor 106 can be operably coupled to the camshaft 108 and configured to drive the camshaft 108 during operation of haptic feedback device 100. The motor 106 can be configured to operate the camshaft 108 based on the signal received from the microcontroller 104. The camshaft 108 can rotate and compressing one or more main bladders 110 disposed below the camshaft 108 in the housing. As the main bladder 110 is compressed by camshaft 108, air flows from the main bladder 110 through tubing 112 to the valve controller 118. In some embodiments, the main bladder 110 is a fluid bladder and fluid (e.g., nitrogen, water, hydraulic fluid, or any other gas or liquid) flows through tubing to the valve controller. In some embodiments, the one or more main bladder 110 is two main bladders 110 linked in parallel. In some embodiments, the one or more main bladder 110 can be more than two main bladders 110. The arrangement of the one or more main bladders 110 can be determined based on size, weight, and/or composition of material. In some embodiments, two main bladders 110 are shown to improve rebound time following compression. The main bladder 110 and haptic sensors 102 can be constructed from a flexible and rigid material, for example Polyjet photopoylmers. In some embodiments, the main bladder 110 and haptic sensors 102 can be 3D printed.

The valve controller 118 can include a valve control circuit 200 (shown in FIG. 2) and one or more valves 114A, 114B, 114C, 114D (collectively "114"). The valves can correspond to haptic sensors 102, respectively. In some embodiments, the valves can be solenoid valves. The valve controller 118 and the valve control circuit 200 can be configured to receive signals from the microcontroller 104 to operate the one or more valves 114. The one or more valves 114 can actuate and enable air from the tubing 112 and main bladder 110 to flow through the one or more valves 114 to secondary tubing 120A, 120B, 120C, 120D (collectively "120") and to a haptic sensors 102. The one or more valves 114 can include a connection to a power source enabling actuation upon receipt of the signal from the microcontroller 104. The air flowing to the haptic sensors 102 can cause it to inflate generating sensory feedback to the user. In some embodiments, the valve 114 can be any electronically controlled valve.

FIG. 1 shows at least a portion of the haptic feedback device 100 can be installed within a glove 122 and have two main bladders 110, four valves 114 and five haptic sensors 102. The two main bladders 110 to increase rebound time following compression by camshaft 108. The increased rebound time can enable quicker actuation during repetitive user feedback. The four valves 114 can each control a haptic sensors 102 located beneath each fingertip, respectively (e.g., 114A can control 102A via secondary tubing 120A, etc). The ring finger and pinky finger can share a single valve 114D to save weight and power consumption because of their collective common use. In an alternative embodiment, the ring finger and pinky finger can each have an individual valve 114. The motor 106 can rotate the camshaft 108 causing the two main bladders 110 to compress thereby pushing air through tubing 112 to the valve controller 118. The valve controller 118 and valve control circuit 200 can receive signals from the microcontroller 104 to actuate the appropriate valves 114. Based on the signal from the microprocessor 104, the valve control circuit can send a signal to appropriate valves 114 to actuate enabling air flow from the main bladder 110 to reach the appropriate haptic sensors 102.

Figure 2:
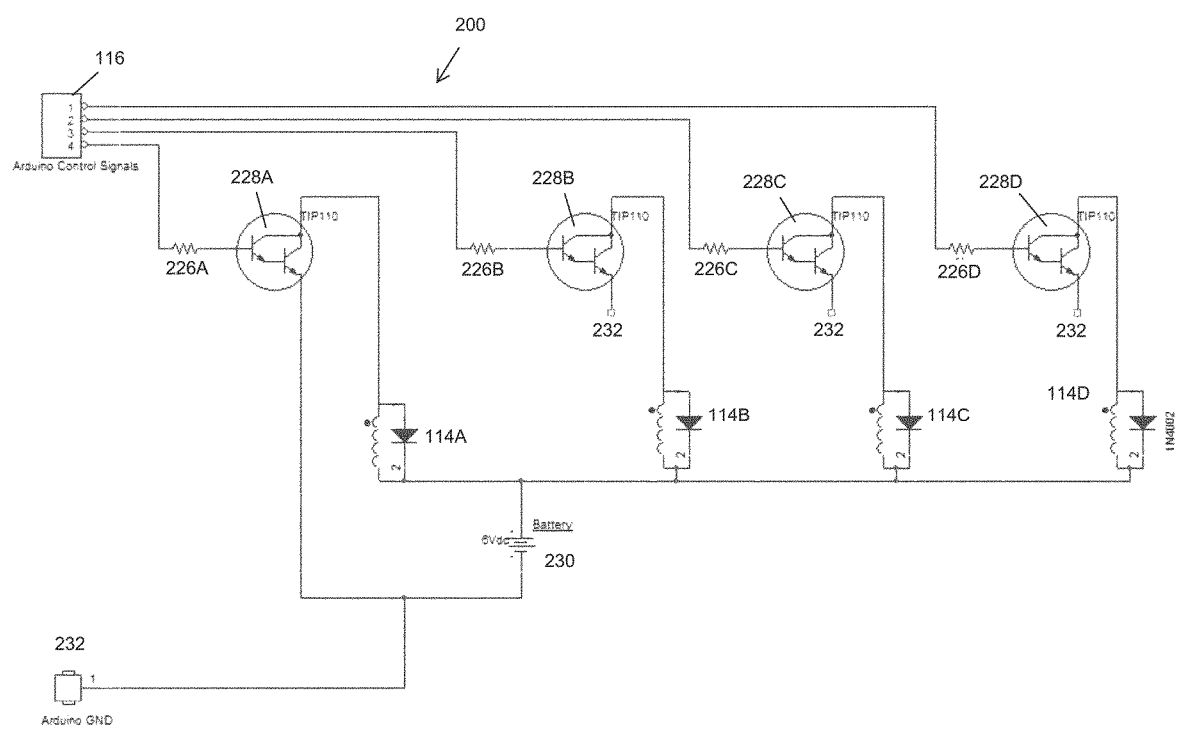
FIG. 2 is a diagrammatic view of an example embodiment of a haptic feedback device control circuit.

FIG. 2 illustrates an example valve control circuit 200 of valve controller 118. The valve controller 118 can include a valve control circuit 200 and one or more valves 114. The valve control circuit 200 can use microcontroller 116 (e.g., Arduino controller) to control actuation of the one or more valves 114. Multiple valves 114 can be arranged in parallel to provide individual functionality of the haptic sensors 102.

The valve control circuit 200 can have a microcontroller 116 with four valves 114 in parallel. Each valve 114 within the valve control circuit 200 can be actuated individually, enabling more control and combinations of haptic sensors to be achieved. For example, each haptic sensors can be actuated individually or in combination with one another. Each valve control loop can include a resistor (226A, 226B, 226C, 226D), a logic gate (228A, 228B, 228C, 228D), the valves (114A, 114B, 114C, 114D), a power source 230, and a ground 232. The microcontroller 116 can determine (i.e., from a data received from microcontroller 104) which valves 114 should be opened and send a signal to the appropriate valves 114. For example, a user's avatar is tapping on a table alternating between his index finger and his middle finger. The microcontroller 116 can send alternating signals to open valves corresponding to the index and middle fingers and then subsequently close valves. This process can repeat as the user repeats the tapping based on signals received by the microcontroller 104 from the computer system. In some embodiments, microcontroller 104 can control values 114.

Figure 3:
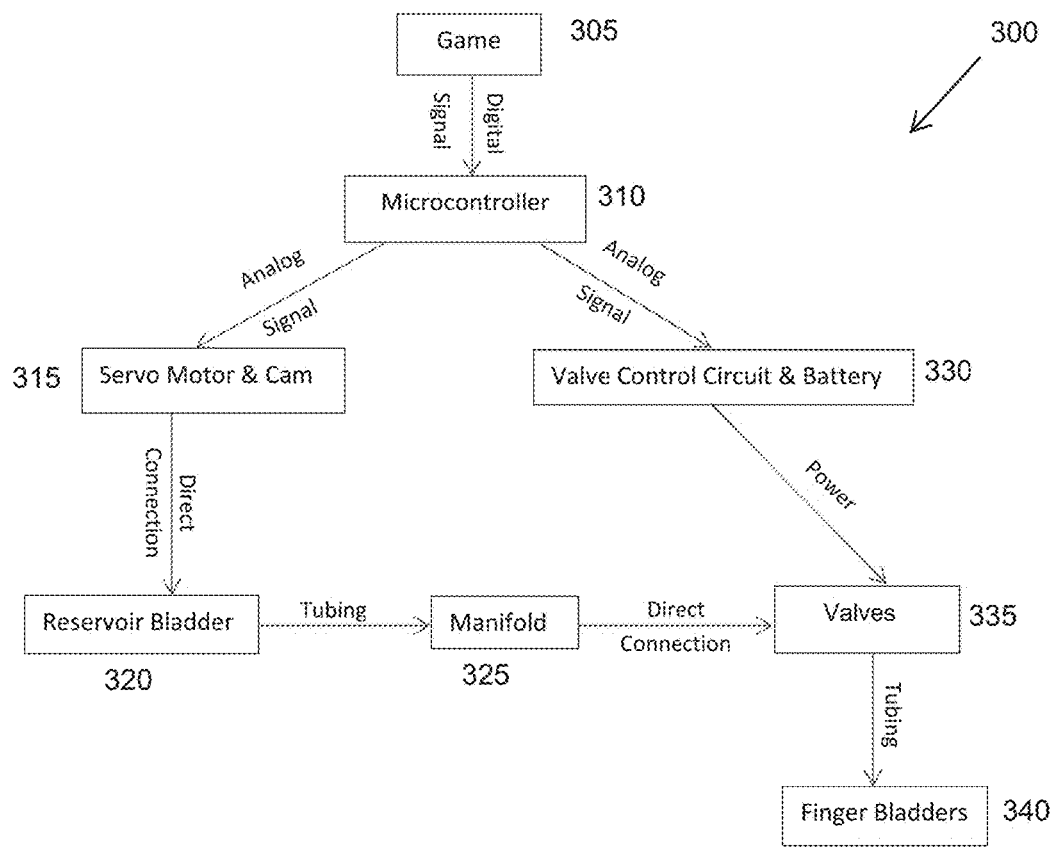
FIG. 3 is a flow chart of an example embodiment of a haptic feedback device.

FIG. 3 shows a flowchart is presented in accordance with an example embodiment. The example method 300 is provided by way of example, as there are a variety of ways to carry out the method. The method 300 described below can be carried out using the configurations illustrated in FIG. 1 and FIG. 2, for example, and various elements of these figures are referenced in explaining example method 300. Each block shown in FIG. 3 represents one or more processes, methods or subroutines, carried out in the example method 300. Furthermore, the illustrated order of blocks is illustrative only and the order of the blocks can change according to the present disclosure. Additional blocks may be added or fewer blocks may be utilized, without departing from this disclosure. The example method 300 can begin at block 305.

At block 305, a computer system can generate a virtual reality simulation where a user interacts with a virtual environment. The computer system can track a user's movements through the virtual environment (e.g., by a camera system, inertial sensors, etc.). The camera system can be one or more cameras calibrated to determine a user's movements within the field of the camera. The one or more camera can have one or more lens configured to provide multiple viewing angles. The multiple viewing angles can enable the computer system to determine the user's movement relative to a three-dimension environment. In some embodiments, three cameras can be placed at various locations to determine movement in multiple directions, such that one camera determines position in an x-plane, one camera determines, position in a y-plane, and one camera determines position in a z-plane. Alternatively, less than three cameras can be used with at least one camera determining position in multiple planes. Depending on the camera arrangement, the computer system can apply an algorithm to determine movement from a first position to a second position, and translate the movement to a user's avatar. In some embodiments, an Xbox Kinect camera can track a user's movements and the computer system translates them to a user's avatar movements within a virtual environment. In some embodiments, IMU sensors can be used to track the movement of a user's fingers. As the user's avatar interacts with the virtual environment and the computer system, the method can proceed to block 310.

At block 310, a microcontroller 104 receives signals from the computer system relating to the user's movements within the virtual environment. The microcontroller 104 then sends a signal to a motor 106 corresponding to the user's virtual movements and the method can proceed to block 315. The microcontroller 104 also sends a signal to a valve controller 118 corresponding to the user's virtual movements and the method proceeds to block 330.

At block 315, the motor 106 receives the signal corresponding to the user's virtual movements from the microcontroller 104 to actuate the camshaft 108. The signal received from the microcontroller can indicate the required movement of the camshaft 108. The motor 106 can cause the camshaft 108 to rotate an amount corresponding to the signal received from the microcontroller 104. The method proceeds to block 320.

At block 320, the camshaft 108 compresses a main bladder 110 generating air flow through tubing 112 to a manifold (not shown) within a valve controller 118. The method then proceeds to block 325.

At block 325, the manifold (not shown) filters the air to one or more valves 114 from tubing 112. The method then proceeds to block 335.

At block 330, the valve controller 118 receives a signal from the microcontroller 104 indicating which solenoid(s) 114 to actuate. The valve controller 118 can then send a signal to the appropriate one or more solenoids. The method then proceeds to block 335.

At block 335, the one or more valves 114 can receive a signal from the valve controller 118 and actuate the corresponding valves 114 in response to the signal. The air flow generated by the compression of the main bladder 110 can then flow through the valves 114. The method then proceeds to block 340.

At block 340, the air flow generated by the compression of the main bladder 110 flows from the valves 114 through tubing to the corresponding one or more haptic sensors associated with the specific one or more solenoid actuated by the signal received from the valve controller 118. The inflation of the haptic sensors can generate haptic feedback to the user wearing glove 122. The method 300 can then repeat as necessary depending of the computer systems tracking of the user's movement within the virtual environment.

Figure 4A:
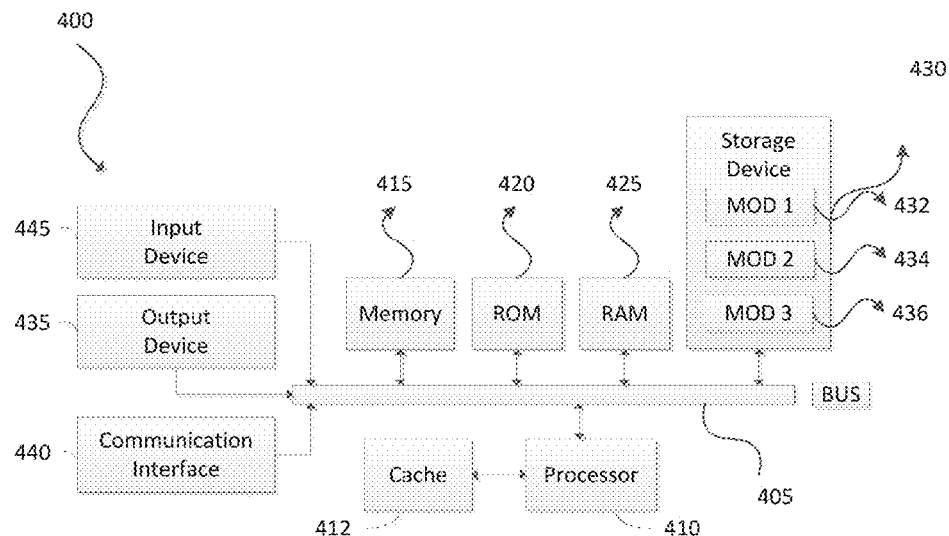
FIG. 4A shows an exemplary possible system embodiment for implementing various embodiments of the present technology.
Figure 4B:
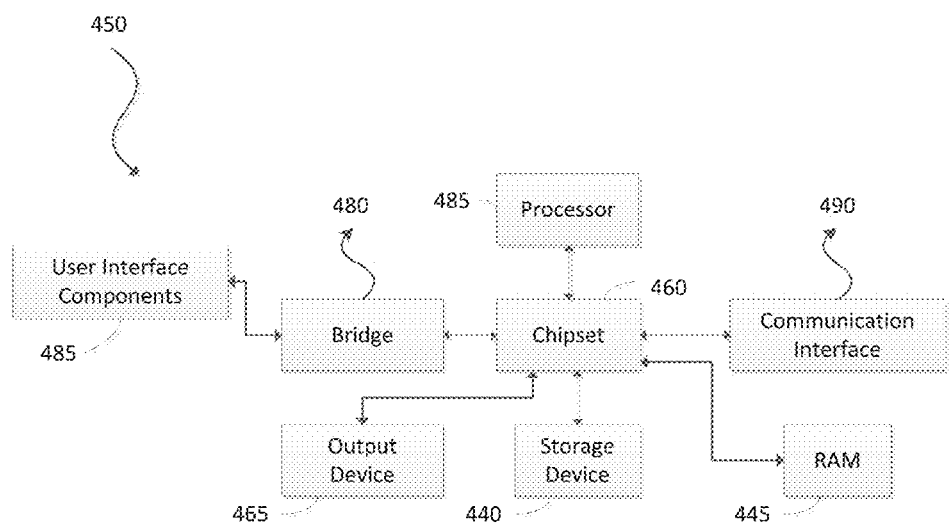
FIG. 4B shows an exemplary possible system embodiment for implementing various embodiments of the present technology.

FIG. 4A and FIG. 4B show exemplary possible system embodiments. The more appropriate embodiment will be apparent to those of ordinary skill in the art when practicing the present technology. Persons of ordinary skill in the art will also readily appreciate that other system embodiments are possible.

FIG. 4A illustrates a conventional system bus computing system architecture 400 wherein the components of the system are in electrical communication with each other using a bus 405. Exemplary system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B illustrates a computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 440, which can include magnetic media, and solid state media, for example. Chipset 460 can also read data from and write data to RAM 445. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 440 or 445. Further, the machine can receive inputs from a user via user interface components 485 and execute appropriate functions, such as browsing functions by interpreting these inputs using processor 455.

It can be appreciated that exemplary systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A haptic feedback device comprising:
  a housing enclosing:
  a microprocessor;
  a motor coupled to a camshaft;
  at least one inertial sensor configured to transmit movement data to a computing device;
  a main bladder disposed beneath the camshaft and coupled to a valve controller by a first tubing, wherein the main bladder is filled with air; and the valve controller having a manifold and one or more valves, wherein the manifold is coupled to the first tubing and coupled to the one or more valves;

a glove enclosing:
  at least five haptic sensors coupled to at least four valves of the one or more valves, each of the at least five haptic sensors are individually coupled to the at least four valves by a second tubing, wherein two of the at least five haptic sensors are coupled to one of the at least four valves;

wherein, the microprocessor is configured to receive a signal from the computing device in response to the movement data received from the at least one inertial sensor and in response actuates the motor which rotates the camshaft to depress the main bladder forcing the air within the main bladder to the one or more valves and controlling the valve controller to open the one or more valves to actuate the one or more haptic sensors, the opening of the one or more valves being configurable for a rapid inflation or gradual inflation based on the signal.

2. The haptic feedback device of claim 1, wherein the haptic sensors are bladders.

3. The haptic feedback device of claim 2, wherein the one or more haptic sensors includes five bladders.

4. The haptic feedback device of claim 2, wherein the one or more haptic sensors includes four bladders.

5. The haptic feedback device of claim 1, wherein the one or more valves are independently actuated.

6. A method comprising:
  receiving, from a computing device in response to movement data sent by an inertial sensor, a first command to actuate at least five haptic sensors, wherein the first command including either a rapid inflation type or a gradual inflation type based on the movement data;
  actuating, by a microprocessor, a motor coupled to a camshaft, wherein in response to the motor being actuated the camshaft depresses a main bladder filled with air;
  sending, by the microprocessor, a second command to a valve controller; and
  in response to receiving the second command, the valve controller actuates one or more valves of at least four valves coupled to the main bladder by a first tubing, wherein one or more haptic sensors of the at least five haptic sensors are actuated through a second tubing by the opening of the valves to receive the air from the main bladder, wherein two of the at least five haptic sensors are coupled to one of the at least four valve.

7. The method of claim 6, wherein the haptic sensors are bladders.

8. The method of claim 7, wherein the one or more haptic sensors includes five bladders.

9. The method of claim 7, wherein the one or more haptic sensors includes four bladders.

10. The method of claim 6, wherein the one or more valves are independently actuated.

11. A non-transitory computer-readable medium containing instructions, which when executed by a processor cause the process to perform the operations of:
  receive, from a computing device in response to movement data sent by an inertial sensor, a first command to actuate at least five haptic sensors, wherein the first command including either a rapid inflation type or a gradual inflation type based on the movement data;
  actuate a motor coupled to a camshaft, wherein in response to the motor being actuated the camshaft depresses a main bladder filled with air;
  send a second command to a valve controller; and
  in response to receiving the second command, the valve controller actuates one or more valves of at least four valves coupled to the main bladder by a first tubing, wherein one or more haptic sensors of the at least five haptic sensors are actuated through a second tubing by the opening of the valves to receive the air from the main bladder, wherein two of the at least five haptic sensors are coupled to one of the at least four.

12. The non-transitory computer-readable medium of claim 11, wherein the haptic sensors are bladders.

13. The non-transitory computer-readable medium of claim 12, wherein the one or more haptic sensors includes five bladders.

14. The non-transitory computer-readable medium of claim 13, wherein the one or more haptic sensors includes four bladders.

15. The non-transitory computer-readable medium of claim 14, wherein the one or more valves are independently actuated.

* * * * *